United States Patent [19]

Haug et al.

[11] 4,247,672
[45] Jan. 27, 1981

[54] HEAT-CURABLE MIXTURES BASED ON POLYIMIDES AND POLY-β-IMINOCROTONONITRILES

[75] Inventors: Theobald Haug, Frenkendorf; Jürg Kiefer, Reinach, both of Switzerland

[73] Assignee: Ciba-Geigy Corporation, Ardsley, N.Y.

[21] Appl. No.: 58,223

[22] Filed: Jul. 16, 1979

[30] Foreign Application Priority Data

Jul. 27, 1978 [CH] Switzerland .................. 8083/78

[51] Int. Cl.³ .................. C08F 22/40; C08G 73/12
[52] U.S. Cl. .................. 526/262; 526/258; 526/277; 526/288; 526/298; 528/322
[58] Field of Search .............. 528/322, 321, 168, 170; 526/262

[56] References Cited

U.S. PATENT DOCUMENTS

| | | | |
|---|---|---|---|
| 3,018,290 | 1/1962 | Sauers et al. | 260/326.26 |
| 3,522,271 | 7/1970 | Kalif | 260/326.26 |
| 4,089,845 | 5/1978 | Haug et al. | 528/322 |

*Primary Examiner*—Harold D. Anderson
*Attorney, Agent, or Firm*—Luther A. R. Hall

[57] ABSTRACT

Heat-curable mixtures which are stable on storage and consist of (a) poly-imides of specific unsaturated dicarboxylic acids of the general formula I

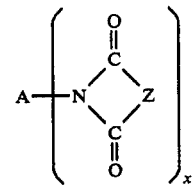

in which A is a x-valent organic radical having at least 2 and not more than 30 carbon atoms, Z is a radical of the formulae

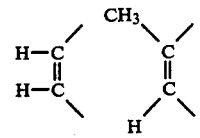

and x is the number 2 or 3, and (b) poly-(β-iminocrotononitriles) of the formula II, III and/or IV

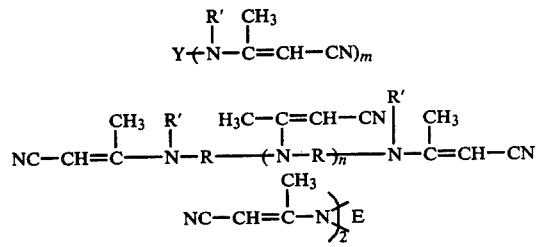

in which Y is a m-valent organic radical having at least 2 and at most 30 carbon atoms, R' is a hydrogen atom or an alkyl having 1 to 6 carbon atoms, cycloalkyl having 5 or 6 carbon atoms or aryl having 6 to 10 carbon atoms, R is an aliphatic or aromatic radical having not more than 30 carbon atoms, E, together with the two nitrogen atoms, is a five-membered or six-membered ring, m is 2 or 3 and n is 1 or 2, are suitable for the production of moulded materials, preferably by casting the resin mixture or by laminating or bonding substrates.

10 Claims, No Drawings

HEAT-CURABLE MIXTURES BASED ON POLYIMIDES AND POLY-β-IMINOCROTONONITRILES

The present invention relates to novel mixtures which are based on polyimides of specific unsaturated dicarboxylic acids and poly-(β-iminocrotononitriles) and are stable on storage and heat-curable and to a process for the production of moulded materials from these curable mixtures.

It has already been disclosed in German Offenlegungsschrift No. 2,529,092 that mixtures of bis-maleimides and β-aminocrotonic acid derivatives can be processed to infusible and insoluble moulded materials with valuable mechanical properties. However, these curable mixtures have the disadvantages that they have too short a gel time when hot to enable them to be used as casting resins in practice. It has now been found the poly-(β-iminocrotononitriles) in mixtures with bis-maleimides are not only better to handle and process when hot but that moulded materials with comparatively better mechanical properties are also obtained from these mixtures.

The present invention thus relates to novel, heat-curable mixtures which are stable on storage and which contain a) poly-imides of specific unsaturated dicarboxylic acids of the general formula I

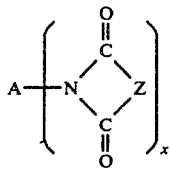
(I)

in which A is a x-valent organic radical having at least 2 and not more than 30 carbon atoms, Z is a radical of the formulae

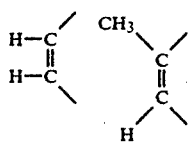

and x is the number 2 or 3, and b) poly-(β-iminocrotononitriles) of the formula II, III and/or IV

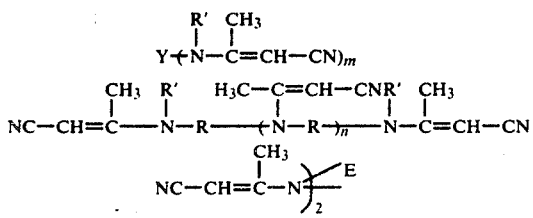

in which Y is a m-valent organic radical having at least 2 and not more than 30 carbon atoms, R' is a hydrogen atom or an alkyl having 1 to 6 carbon atoms, cycloalkyl having 5 or 6 carbon atoms or aryl having 6 to 10 carbon atoms, R is an aliphatic or aromatic radical having not more than 30 carbon atoms, E, together with the two nitrogen atoms, is a five-membered or six-membered ring, m is 2 or 3 and n is 1 or 2.

Preferably, the mixtures according to the invention contain a) poly-imides of the formula I in which A is a radical of the formulae

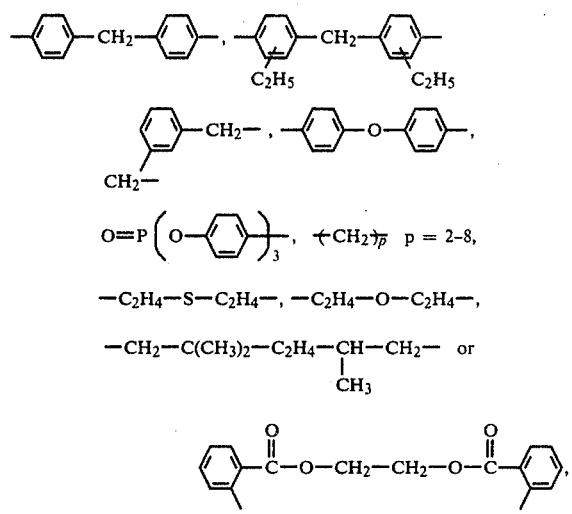

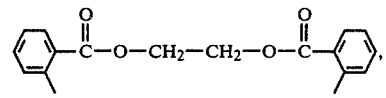

Z is the vinylene radical and x is 2 or 3, and b) poly-(β-iminocrotononitriles) of the formula II, III and/or IV, in which Y is a radical of the formulae

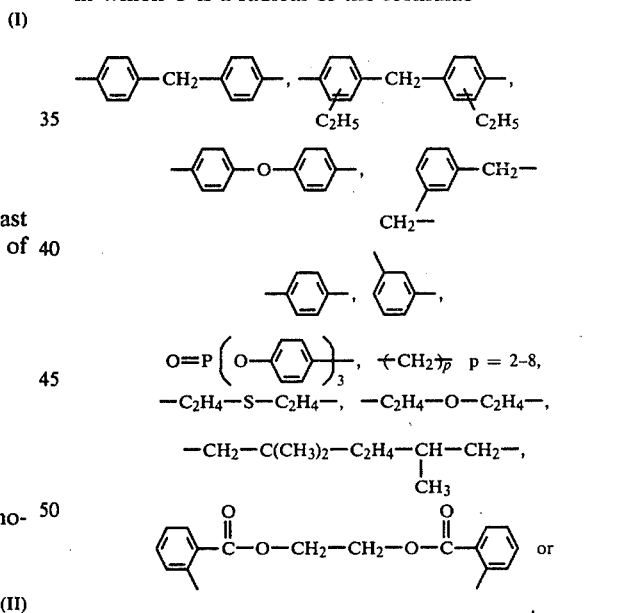

 or

R' is a hydrogen atom, R is the ethylene radical and n is 1 and the grouping

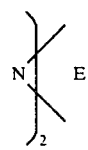

is the radical of the formula

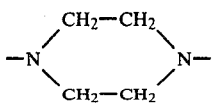

In a paricular embodiment, the mixtures according to the invention consist of (a) polyimides of the formula I and (b) poly-(β-iminocrotononitriles) of the formula II or III, wherein, in the formula I, A is a radical of the formulae

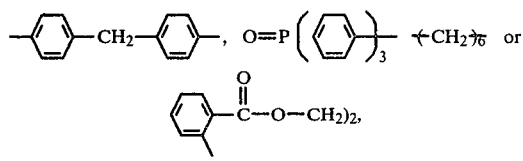

Z is the vinylene radical and x is 2 or 3 and, in the formula II, Y is a radical of the formulae

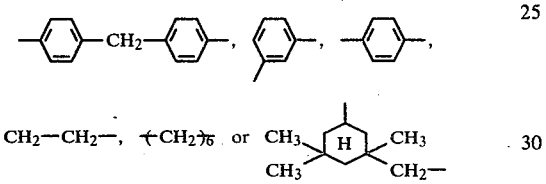

R' is a hydrogen atom and m is 2 and wherein, in the formula III, R is ethylene, R' is a hydrogen atom and n is 1.

The poly-imides of the formula I are a known category of compounds and can be prepared using the methods described in U.S. Pat. No. 3,018,290 and in British Pat. No. 1,137,592, by reacting the corresponding diamines with the unsaturated dicarboxylic acid anhydrides in a polar solvent and in the presence of a catalyst.

The symbol A in the formula I can be a linear or branched alkylene radical having less than 20 carbon atoms, a phenylene radical, a cyclohexylene radical or a radical of the formula

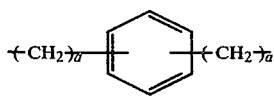

in which a is an integer from 1 to 3.

The symbol A can also comprise several phenylene or cyclohexylene radicals, which are linked direct or by a single valency bond or by an atom or an inert group, for example oxygen or sulfur atoms or alkylene groups having 1 to 3 carbon atoms or via the following groups —CO—, —SO₂—, —NR—, (R=alkyl), —N=N—, —CONH—, —COO—, —CONH—A—NHCO—, O=P(O—)₃ or S=P(O—)₃.

Moreover, the various phenylene or cyclohexylene radicals can be substituted by methyl groups.

Specific examples of poly-imides of the formula I are: N,N'-ethylene-bis-maleimide, N,N'-hexamethylene-bis-maleimide, N,N'-m-phenylene-bis-maleimide, N,N'-p-phenylene-bis-maleimide, N,N'-4,4'-diphenylmethane-bis-maleimide, N,N'-4,4'-dichloro-diphenylmethane-bis-maleimide, N,N'-(4,4'-diphenyl ether)-bis-maleimide, N,N'-4,4'-diphenylsulfone-bis-maleimide, N,N'-4,4'-dicyclohexylmethane-bis-maleimide, N,N'-α,α'-4,4'-dimethylenecyclohexane-bis-maleimide, N,N'-m-xylylene-bis-maleimide, N,N'-p-xylylene-bis-maleimide, N,N'-4,4'-diphenylcyclohexane-bis-maleimide, N,N'-m-phenylene-bis-citraconimide, N,N'-4,4'-diphenylmethane-bis-citraconimide, N,N'-4,4'-2,2-diphenylpropane-bis-maleimide, the N,N',N''-tris-maleimide of tris-(4-aminophenyl) phosphate and the N,N',N''-tris-maleimide of tris-(4-aminophenyl) thiophosphate.

Mixtures of two or more of these poly-imides can also be used.

The N-alkylene- or N-arylene-poly-(β-iminocrotononitriles) of the formulae II to IV likewise belong to a known category of compounds and can be prepared by the processes described in "Journal für praktische Chemie", volume 78 (1908), page 497, or in "Berichte der Deutschen Chemischen Gesellschaft", volume 60 (1927), page 1,826, by reacting β-aminocrotononitrile with polyamines of the formulae IIa to IVa

  (IIa)

  (IIIa)

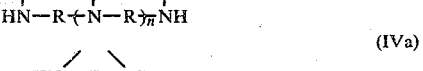  (IVa)

in which Y, R, R', m, n and E are as defined in the formulae II to IV, with the elimination of ammonia.

Examples of amines of the formula IIa are: ethylenediamine, butylenediamine, hexamethylenediamine, 2,4,4-trimethylhexamethylenediamine, octamethylenediamine, decamethylenediamine, dodecamethylenediamine, 2,2-dimethyl-1,3-diaminopropane, 2,5-dimethyl-1,5-diaminoheptane, 2,5-dimethyl-1,6-diamino-hexane, 2,5-dimethyl-1,7-diaminoheptane, 3,3,5-trimethyl-1,6-diaminohexane, 1,2-bis-(3-aminopropoxy)-ethane, 3-methoxy-1,6-diaminohexane, H₂N(CH₂)₃O(CH₂)₃NH₂, H₂N(CH₂)₃NH₂, H₂N-C₂H₄-S-C₂H₄-NH₂, H₂N(CH₂)₃N(CH₂)₃NH₂, 4,4'-diaminodicyclohexylmethane, 1,4-diamino-cyclohexane, m-phenylenediamine, p-phenylenediamine, 4,4'-diamino-diphenyl-methane, 3,3'-dichloro-4,4'-diamino-diphenylmethane, bis-(4-aminophenyl)-2,2-propane, 4,4'-diamino-diphenyl ether, 4,4'-diaminodiphenylsulfone, 1,5-diaminonaphthalene, m-xylylenediamine, p-xylylenediamine, bis-(γ-aminopropyl)-5,5-dimethylhydantoin, 4,4'-diaminotriphenyl phosphate, 3-aminomethyl-3,5,5-trimethylcyclohexylamine ("isophoronediamine"), 4,4'-methylene-bis-(2-methylcyclohexylamine), 4-amino-3-aminomethylpiperidine, N-substituted 3-amino-4-aminomethylpyrrolidines, phenylindanediamine, 2,5-di-(ω-aminoalkyl)-pyrazine, bis-(p-amino-benzoates) or bis-(anthranilates) of aliphatic diols and also disecondary diamines, such as N,N'-di-(cyclohexyl)-hexamethylenediamine or N,N'-di-(cyclopentyl)-hexamethylenediamine.

Examples of trivalent amines of the formula IIa are: 1,2,4-triaminobenzene, 1,3,5-triaminobenzene, 2,4,6-triaminotoluene, 2,4,6-triamino-1,3,5-trimethylbenzene, 1,3,7-triaminonaphthalene, 2,4,4'-triaminodiphenyl, 3,4,6-triaminopyridine, 2,4,4'-triaminophenyl ether, 2,4,4'-triaminodiphenylmethane, 2,4,4'-triaminodiphenylsulfone, 2,4,4'-triaminobenzophenone, 2,4,4'-triamino-3-methyldiphenylmethane, N,N,N-tri-(4-aminophenyl)-amine, tri-(4-aminophenyl)-methane, tri-(4-aminophenyl) phosphate, tri-(4-aminophenyl) phosphite, tri-(4-aminophenyl) thiophosphate and also
$O=P(O-CH_2-CH_2-NH_2)_3$,

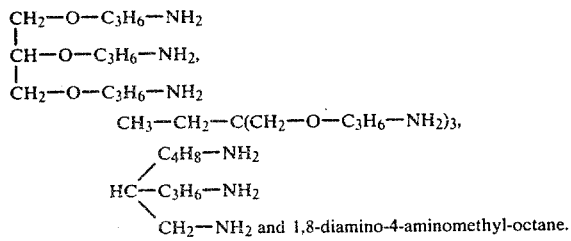

$CH_3-CH_2-C(CH_2-O-C_3H_6-NH_2)_3$, $HC \underset{\diagdown CH_2-NH_2}{\overset{\diagup C_4H_8-NH_2}{-C_3H_6-NH_2}}$ and 1,8-diamino-4-aminomethyl-octane.

Suitable amines of the formula IIIa are, for example, the dialkylenetriamines and trialkylenetetramines, preferably those with an alkylene radical containing 2 to 6 carbon atoms, for example diethylenetriamine triethylenetetramine, dipropylenetriamine, tripropylenetetramine or tributylenetetramine.

Amines of the formula IVa are piperazine, tetrahydropyridine and imidazolidine.

The mixing ratio for the poly-imides of the formula I and the β-iminocrotononitriles of the formulae II–IV can be varied within a wide range. It is chosen so that the number of equivalents of β-iminocrotonyl groups is at most equal to the number of equivalents of imide groups. Preferably, an equivalent excess of imide groups, based on the equivalents of β-iminocrotonyl groups, is present in the curable mixture. A one-fold to 5-fold excess of imide group equivalents can be present in the curable mixture. Preferably, 1.3 to 3 equivalents of maleimide groups are present per 1 equivalent of β-iminocrotononitrile in the curable mixtures.

Curing of the mixtures according to the invention is effected by warming the mixtures to temperatures of between 50 and 280° C. and preferably 150 to 250° C., whereupon the mixtures are converted to crosslinked, insoluble and infusible products without the emission of volatile reaction products.

For some industrial applications it is advantageous to add a curing catalyst. For example, the cured state is reached more rapidly by adding a small amount of an organic peroxide or per-salt. Compounds such as di-tert.-butyl peroxide, dilauryl peroxide, tert.-butyl cumyl peroxide or tert.-butyl perbenzoate in a concentration of 0.01–5 percent and preferably 0.25–0.5 percent, based on the total weight of the curable mixture, are suitable for this purpose. However, other, nonperoxidic curing accelerators or additives which promote curing can also be employed.

It is also possible first to prepare a prepolymer from the mixtures according to the invention, by heating the homogeneously mixed starting materials, which are finely ground if necessary, to 50°–140° C. for a time, so that a product forms which is still thermoformable and is partially soluble. If necessary, this prepolymer must be ground again to a processable powder. The prepolymerisation can also be effected by heating a solution or suspension of the starting materials. Suitable substances for this purpose are those which do not react with the starting materials and which dissolve these materials to an adequate extent if desired. Examples of such liquids are: dimethylformamide, tetramethylurea, dimethylsulfoxide, N-methylpyrrolidone, dichloroethylene, tetrachloroethylene, tetrachloroethane, tetrabromoethane, chlorobenzene, dichlorobenzene, bromobenzene, cyclohexanone, dioxan or alkylated aromatic hydrocarbons.

The curable mixtures according to the invention are used in particular in the fields of surface protection, electrical engineering, laminating processes and in the building trade. They can be used in a formulation which in each case is suited to the particular application, in the unfilled or filled state and if desired in the form of solutions or dispersions, and as lacquers, compression moulding compositions, sintering powders, dipping resins, injection moulding formulations, impregnating resin, binders, laminating resins and foam resins and especially as casting resins.

The invention therefore also relates to a process for the production of crosslinked, insoluble and infusible plastic products, which comprises reacting poly-imides of specific unsaturated carboxylic acids of the formula I with poly-(β-iminocrotononitriles) of the formulae II–IV with one another, if desired in the presence of a curing catalyst, at temperatures between 50° and 280° C. and preferably at 150° to 250° C.

The production, according to the invention, of the crosslinked, infusible products is as a rule effected with simultaneous shaping to give mouldings, sheet-like structures, laminates, adhesive bonds or foams. The additives customarily used in the technology of curable plastics, such as fillers, plasticisers, pigments, dyes, mould release agents, blowing agents and flame retardants, can be added to the curable mixtures. Fillers which can be used are, for example, glass fibres, mica, quartz powder, kaolin, colloidal silica or metal powders; a mould release agent which can be used is, for example, calcium stearate and blowing agents which can be used are, for example, azodicarboxylic acid amides, α,α'-azoisobutyronitrile or organic sulfohydrazides. Depending on its type, the blowing agent is employed in amounts of 0.5–15% by weight, based on the total amount of the mixture.

If a prepolymer is first prepared from the curable mixtures, this, when ground to a fine powder, can be used as a surface protection agent by the whirl-sintering process. A solution or suspension of the prepolymer in a suitable solvent can be used to prepare laminates, by impregnating porous sheet-like structures, such as fabrics, fibre mats or non-wovens, especially glass fibre mats or glass fibre fabric, with solutions or suspensions and removing the solvent by a drying process. Further curing is effected in a press, preferably at 170°–250 C. and under 5–200 kp/cm² pressure. It is also possible only to effect pre-curing of the laminates in the press and to post-cure the products thus obtained in an oven at 200°–280° C. until optimum characteristics for use are obtained.

TABLE 1

Comparison of the gel times of mixtures, according to the invention, of bis-maleimides and bis-(β-iminocrotononitriles) and mixtures according to German Offenlegungsschrift No. 2,529,092 of bis-maleimides and bis-(β-aminocrotonic acid esters or -crotonic acid amides)

| Mixture No. | Maleimide | Crotonic acid derivative | Gel time at 150° C. [minutes + seconds] |
|---|---|---|---|
| 1* | bis-maleimide of 4,4'-methylenedianiline structure | NC—CH=C(CH₃)—NH—(C₆H₄)—CH₂ ]₂ | 4'15" |
| 2* | " | NC—CH=C(CH₃)—NH—C₆H₄—NH—C(CH₃)=CH—CN | 3'55"¹ |
| 3* | bis-maleimide with N—C₃H₆ linker | NC—CH=C(CH₃)—NH—(C₆H₄)—CH₂ ]₂ | 25' |
| 4* | " | NC—CH=C(CH₃)—NH—C₃H₆ ]₂ | 4'25" |
| 5 | bis-maleimide of 4,4'-methylenedianiline structure | CH₃OOC—CH=C(CH₃)—NH—(C₆H₄)—CH₂ ]₂ | 0'20" |
| 6 | " | CH₃—C(NH₂)=CH—COOC₂H₄ ]₂ | 0'7" |
| 7 | bis-maleimide with N—C₃H₆ linker | CH₃—C(NH₂)=CH—CONHC₃H₆ ]₂ | 0'5" |

¹ at 160° C.

EXAMPLE 1

63.5 g (0.23 mol) of N,N'-hexamethylene-bis-maleimide (designated "bis-imide I" below) and 38.0 g (0.15 mol) of N,N'-diphenylenemethane-bis-(β-iminocrotononitrile) are mixed and the mixture is melted at 150° C. and degassed in vacuo. The melt is poured into a hot mould with dimensions of 135×135×4 mm and converted by step-wise curing at 140° C./4 hours, 160° C./4 hours, 180° C./10 hours, 200° C./3 hours and 220° C./1 hour into a hard, transparent sheet, the test data of which are given in Table 2.

EXAMPLE 2

69.7 g (0.25 mol) of bis-imide I and 30.0 g (0.125 mol) of N,N'-1,3-phenylene-bis-(β-iminocrotononitrile) are mixed and the mixture is converted as in Example 1 into a clear and transparent sheet, the test data of which are given in Table 2.

EXAMPLE 3

44.2 g (0.16 mol) of bis-imide I and 19.7 g (0.08 mol) of N,N'-hexamethylene-bis-(β-iminocrotononitrile) are mixed well. 8.2 g of this mixture are introduced into a hot, rectangular metal mould which has internal dimensions of 60×28 mm and is at 150° C. and a further 5 g of this mixture are introduced into a hot, circular metal mould which has a diameter of 50 mm and is at 160° C. The mixture melts rapidly to give a homogeneous liquid, which is converted by curing at 160° C./6 hours and 180° C./2 hours into a rectangular moulding with dimensions of 60×28×4 mm and, respectively, a disc-shaped moulding with a diameter of 50 mm and a thickness of about 2 mm. The test data are listed in Table 2.

EXAMPLE 4

33.1 g (0.12 mol) of bis-imide I and 11.4 g (0.06 mol) of N,N'-ethylene-bis-(β-iminocrotononitrile) are mixed well and converted into rectangular and disc-shaped test samples as in Example 3; the measurement data of these test samples are listed in Table 2.

EXAMPLE 5

16.4 g (0.06 mol) of bis-imide I and 12.0 g (0.04 mol) of N,N'-isophorone-bis-(β-iminocrotononitrile) are mixed well and converted into rectangular and disc-shaped test samples as in Example 3; the measurement data of these test samples are listed in Table 2.

EXAMPLE 6

16.6 g (0.06 mol) of bis-imide I, 18.4 g (0.04 mol) of ethylene glycol bis-(2-maleimido-benzoate), 5.95 g (0.025 mol) of N,N'-1,4-phenylene-bis-(β-iminocrotononitrile) and 8.20 g (0.025 mol) of N,N'-4,4'- diphenylmethane-bis-(β-iminocrotononitrile) are mixed well and converted into rectangular and disc-shaped test samples as in Example 3; these test samples are also moulding temperature of 170° C. and a moulding pressure of about 230 Kp/cm². The mechanical test data of this moulding are listed in Table 2.

Table 2

|  | Example | | | | | | | | | |
|---|---|---|---|---|---|---|---|---|---|---|
|  | 1 | 2 | 3 | 4 | 5 | 6 | 7 | 8 | 9 | 10 |
| Flexural strength according to VSM* 77103 (N/mm²) | 134.9 | 153.3 | 159.8 | 93.5 | 67.7 | 77.8 | 57.9 | 81.2 | 76.0 | 56.6 |
| Deflection (mm) | 6.3 | 7.1 | 10.0 | 3.0 | 2.8 | 3.2 | 2.0 | 1.1 | 1.75 | 0.47 |
| Impact strength according to VSM 77105 (KJ/m²) | 26.8 | 19.4 |  |  | 3.07 | 4.9 | 2.7 | 3.6 |  | 1.3 |
| Heat distortion point according to ISO/R 75** (°C.) | 211 | 214 |  |  |  |  |  |  |  | 246 |
| Dielectric loss factor tgδ 10² at 50 Hz, 23° C. | 0.55 |  | 0.40 | 0.37 | 0.75 | 0.50 | 1.38 | 0.63 |  |  |
| Dielectric constant $\epsilon_R$ at 50 Hz, 23° C. | 3.6 |  | 3.7 |  | 4.3 | 4.1 | 4.4 | 4.9 |  |  |
| Volume resistivity (Ω cm) | 4.5 $10^{16}$ |  | 1.2. $10^{15}$ | 3.3. $10^{15}$ | 4.8. $10^{15}$ | 2.2. $10^{15}$ | 2.2. $10^{15}$ | 1.2. $10^{15}$ |  |  |

*VSM: Standards of the Verein Schweizerischer Maschinenindustrieller
**ISO/R: Standards of the International Standard Organization/Recommendation post-cured for 1.5 hours at 200° C. The measurement data are listed in Table 2.

EXAMPLE 7

24.8 g (0.09 mol) of bis-imide I and 12.0 g (0.04 mol) of tris-(β-iminocrotononitrile), prepared from diethylenetriamine and β-aminocrotononitrile, are mixed well and converted into rectangular and disc-shaped test samples as in Example 3; these test samples are post-cured as in Example 6. The test data are listed in Table 2.

EXAMPLE 8

35.8 g (0.1 mol) of N,N'-4,4'-diphenylmethane-bis-maleimide, 11.0 g (0.033 mol) of N,N'-4,4'-diphenylmethane-bis-(β-iminocrotononitrile), 47.0 g of ground glass fibres and 1.2 g of caclium stearate are mixed well in a ball mill. Test samples with dimensions of 60×10×4 mm and discs with a diameter of 50 mm and thickness of 2 mm are produced in moulds pre-heated to 160° C., by introducing the requisite amount of the mixture into these moulds and converting this mixture at a temperature of 160° C. and under a moulding pressure of about 400 Kp/cm² into hard mouldings. These are post-cured outside the mould, at 160° C./1 hour, 180° C./3 hours, 200° C./6 hours and 220° C./2 hours. The measurement data of these test samples are listed in Table 2.

EXAMPLE 9

35.8 g (0.10 mol) of N,N'-4,4'-diphenylmethane-bis-maleimide, 12.3 g (0.15 mol) of N,N'-hexamethylene-bis-(β-iminocrotononitrile) and 48.1 g of ground glass fibres are mixed as in Example 8 and test samples are prepared from this mixture; the test data of these samples are listed in Table 2.

EXAMPLE 10

122 g (0.20 mol) of the N,N',N''-tris-maleimide of tris-(4-aminophenyl) phosphate, 65 g (0.20 mol) of N,N'-4,4'-diphenylmethane-bis-(β-iminocrotononitrile), 502 g of quartz powder and 3.5 g of OP wax are mixed intensively in a ball mill. Sheets with dimensions of 140×140×4 mm are pressed from this mixture at a

What is claimed is:

1. A heat-curable mixture which is stable on storage, which contains
(a) at least one polyimide of the formula I

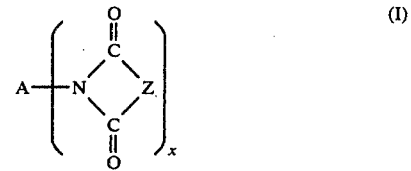

in which A is a x-valent organic radical having at least 2 and not more than 30 carbon atoms, Z is a radical of the formulae

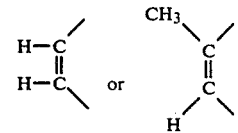

and x is the number 2 or 3, and
(b) at least one poly-(β-iminocrotononitrile) of the formula II, III or IV

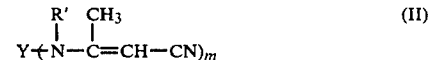

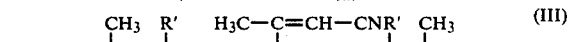

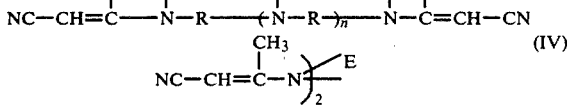

in which Y is a m-valent organic radical having at least 2 and not more than 30 carbon atoms, R' is a hydrogen atom or an alkyl having 1 to 6 carbon atoms, cycloalkyl having 5 or 6 carbon atoms or aryl having 6 to 10 carbon atoms, R is an aliphatic or aromatic radical having not more than 30 carbon atoms, E, together with the two nitrogen atoms, is a five-membered or six-membered ring, m is 2 or 3 and n is 1 or 2.

2. A mixture according to claim 1, which contains
(a) at least one polyimide of formula I, in which A is a radical of the formulae

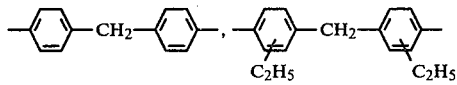

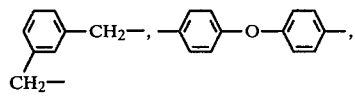

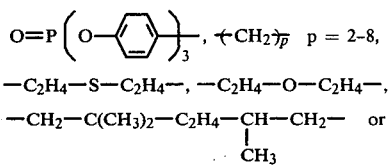

—C$_2$H$_4$—S—C$_2$H$_4$—, —C$_2$H$_4$—O—C$_2$H$_4$—,

—CH$_2$—C(CH$_3$)$_2$—C$_2$H$_4$—CH—CH$_2$— or
　　　　　　　　　　　　　　|
　　　　　　　　　　　　　CH$_3$

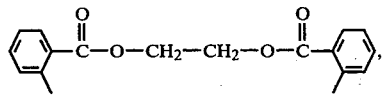

Z is the vinylene radical and x is 2 or 3, and
(b) at least one poly-(β-iminocrotononitrile) of the formula II, III or IV, in which Y is a radical of the formulae

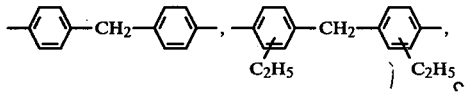

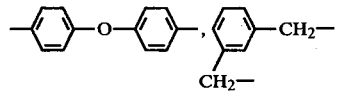

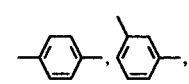

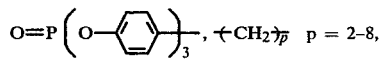

—C$_2$H$_4$—S—C$_2$H$_4$—, —C$_2$H$_4$—O—C$_2$H$_4$—,

—CH$_2$—C(CH$_3$)$_2$—C$_2$H$_4$—CH—CH$_2$—,
　　　　　　　　　　　　　　|
　　　　　　　　　　　　　CH$_3$

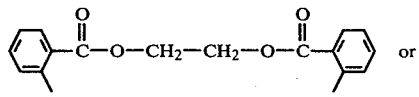 or

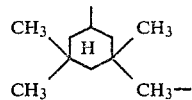

R' is a hydrogen atom, R is the ethylene radical and n is 1 and the grouping

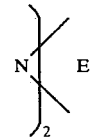

is the radical of the formula

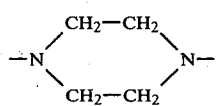

3. A mixture according to claim 1, which contains (a) at least one polyimide of formula I, and (b) at least one poly-(β-iminocrotononitrile) of formula II or III.

4. A mixture according to claim 1, wherein 1 to 5 equivalents of maleimide groups are present per 1 equivalent of β-iminocrotononitrile in the mixture.

5. A mixture according to claim 1, wherein 1.3 to 3 equivalents of maleimide groups are present per 1 equivalent of β-iminocrotononitrile.

6. A mixture according to claim 1, which contains, as the poly-imide of the formula I, N,N'-hexamethylene-bis-maleimide, N,N'-4,4'-diphenylmethane-bis-maleimide or the N,N',N''-tris-maleimide of tris-(4-aminophenyl) phosphate.

7. A mixture according to claim 1, which contains, as a poly-(β-iminocrotononitrile) of the formula II, N,N'-4,4'-diphenylmethane-bis-(β-iminocrotononitrile), N,N'-1,3-phenylene-bis-(β-iminocrotononitrile), N,N'-1,4-phenylene-bis-(β-iminocrotononitrile), N,N'-hexamethylene-bis-(β-iminocrotononitrile), N,N'-ethylene-bis-(β-iminocrotononitrile), or N,N'-isophorone-bis-(β-iminocrotononitrile).

8. A mixture according to claim 1, which contains, as a poly-(β-iminocrotononitrile) of the formula III, the tris-(β-iminocrotononitrile) of diethylenetriamine.

9. A process for the preparation of an insoluble and infusible plastic product from a curable mixture according to claim 1, which comprises reacting this mixture at temperatures between 50° and 280° C.

10. A process according to claim 9 wherein the curable mixture is reacted at temperatures between 50° and 280° C. in the presence of a curing catalyst.

* * * * *